Oct. 3, 1950  F. J. KNOBLAUCH  2,524,669
WAGON HITCH FOR COMBINES
Filed Nov. 30, 1949  2 Sheets-Sheet 1
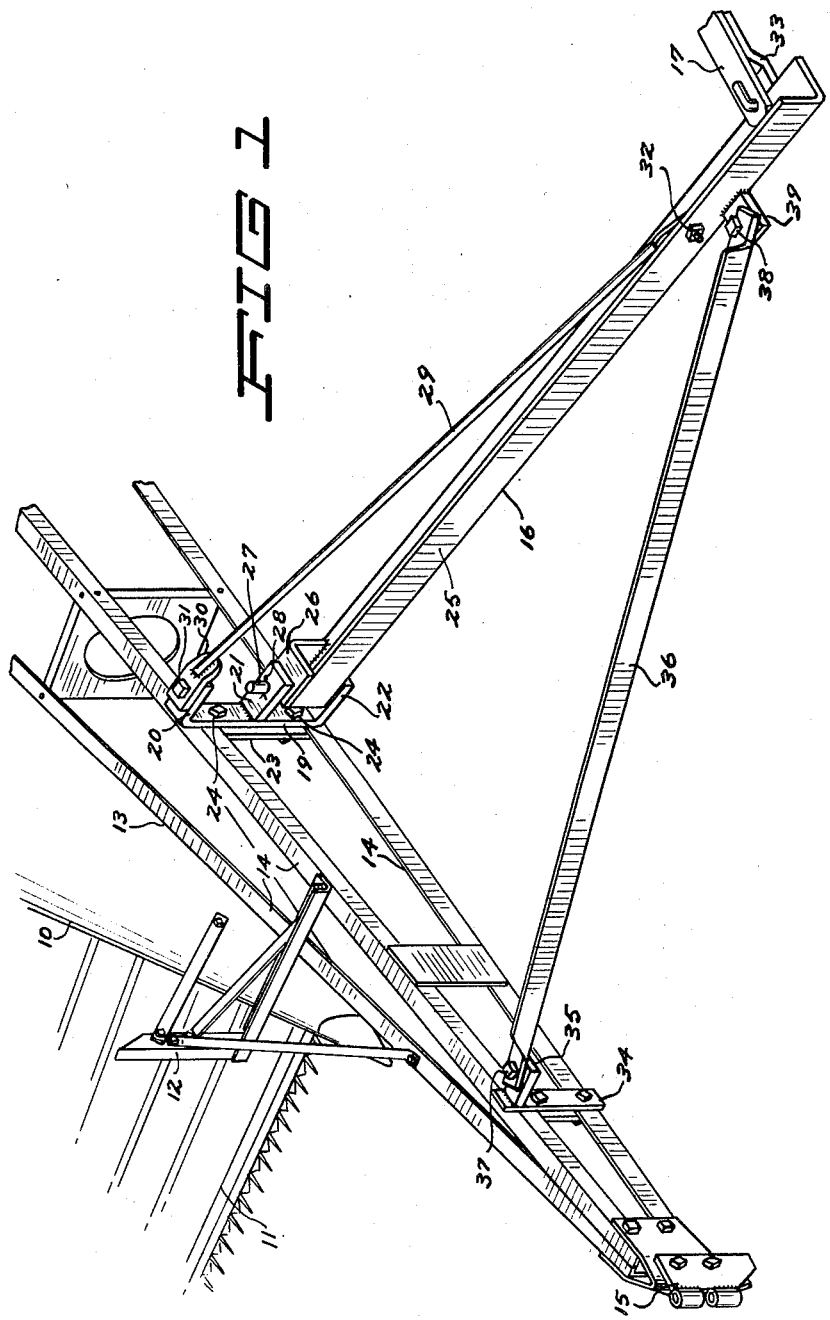
Inventor
FRANCIS J. KNOBLAUCH
By Carlsen & Hazle
Attorneys

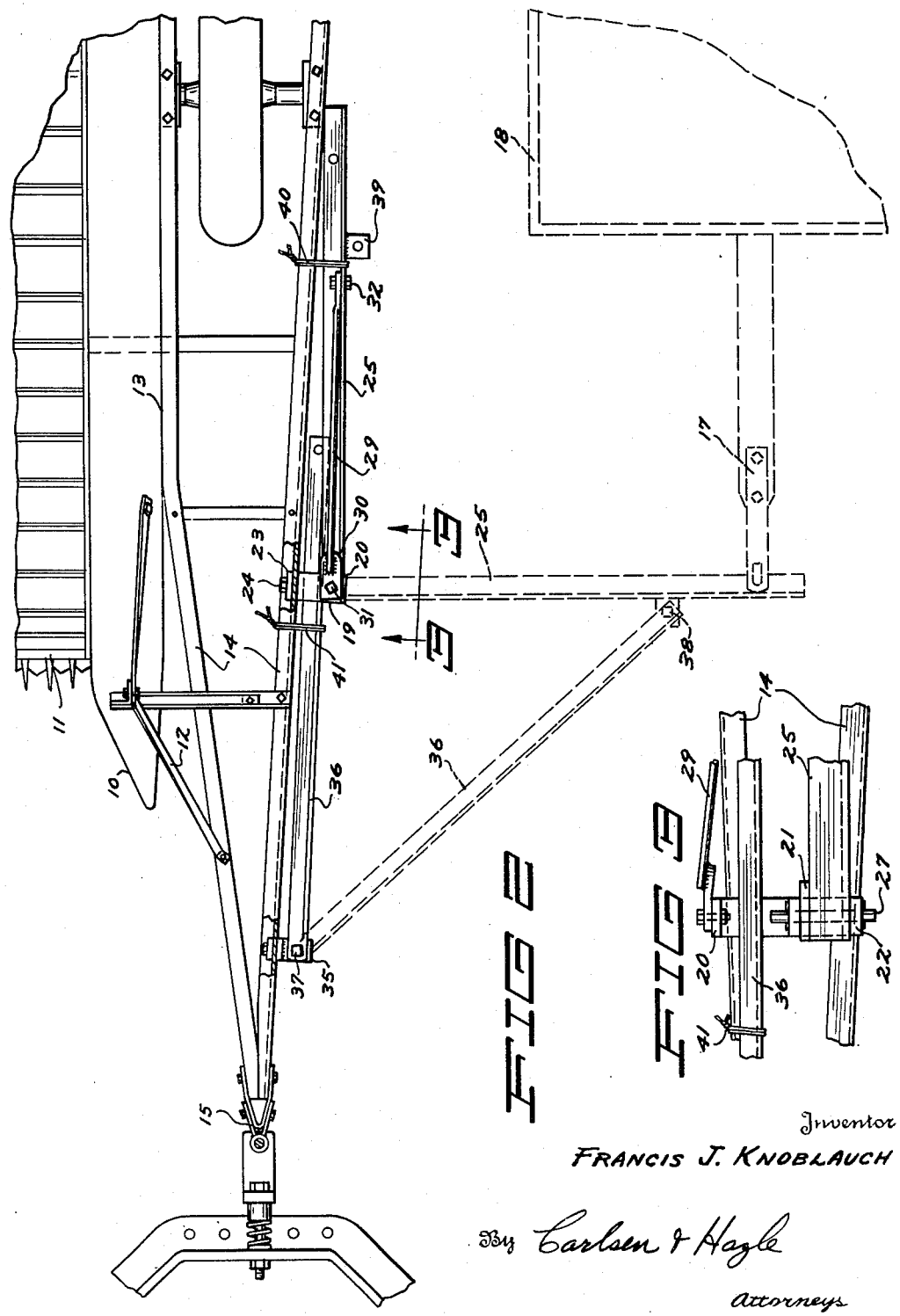

Patented Oct. 3, 1950

2,524,669

UNITED STATES PATENT OFFICE 2,524,669

WAGON HITCH FOR COMBINES

Francis J. Knoblauch, Tracy, Minn.

Application November 30, 1949, Serial No. 130,124

2 Claims. (Cl. 280—33.44)

This invention relates generally to a wagon hitch for implements and more particularly to a hitch adapted to draw a wagon at one side of an implement such as a combine to facilitate continuous collection in the wagon of material moving laterally from the combine.

The purpose of my invention is to provide a hitch mechanism for pulling a wagon alongside a combine for receiving the grain which has been harvested thereby. As grain is harvested and threshed it is usually deposited in a bin carried by the combine. When the bin is full the machine must be stopped while the bin is unloaded into a wagon brought up alongside the machine. My invention allows the wagon to be hitched to the combine to travel therebeside so that the grain may be loaded directly into the wagon.

Hitches have heretofore been provided for pulling a wagon alongside an implement in a laterally offset position. However, to my knowledge none of these devices have been so constructed as to allow movement of the hitch to an out of the way position when it is desired to use or store the implement without the wagon.

It is therefore, the primary object of my invention to provide a means for hitching a wagon alongside a combine or the like and which means may be collapsed or folded to an out of the way position when not in use.

Another object of my invention is to provide an improved wagon hitch forming a strong and rigid draft connection and yet which is of such simple construction as to permit its manufacture at a relatively low cost.

With these and other objects in view the invention broadly embodies a hitch member mounted on the implement to extend laterally to the wagon tongue and a brace member extending between the implement and the hitch member to rigidly support the hitch member, and both members being pivotally mounted on the implement to allow them to be folded back against the implement when the hitch is not in use.

The more detailed and specific objects of my invention will be disclosed in the course of the following specification reference being had to the accompanying drawings in which:

Fig. 1 is a perspective view of my improved hitch mounted on the draft frame of a combine and extending laterally in its operating position for connection with a wagon draft means.

Fig. 2 is a plan view of the mounted hitch folded back and secured against the implement in non-operating position. In this view the hitch in operating position and the loading wagon are shown in broken lines.

Fig. 3 is a fragmentary view taken along the line 3—3 in Fig. 2.

Referring now more particularly to the accompanying drawings, and by reference characters, the numeral 10 denotes a wheel mounted implement such as a grain combine having a mower or harvester section 11, a mower adjustment mechanism 12, and a main implement draft frame 13. The draft frame comprises a series of forwardly extending and converging bars 14 and a coupling member 15 for hitching to a tractor or other propelling unit. The outer bars 14 converge as shown on a common vertical plane.

I provide a hitch frame shown generally at 16 to extend laterally outward from the draft frame 13 for connection with the tongue 17 of a conventional loading wagon 18.

The hitch frame 16 is constructed and mounted on the implement draft frame substantially as follows: An E-shaped bracket 19 is mounted vertically with its back against the outer bars 14 and the upper middle, and lower bracket arm extensions 20, 21, and 22 respectively projecting horizontally and laterally away from the draft frame. A retaining plate 23 extends between the bars 14 on the inner side thereof and is bolted as at points 24 to the bracket 19 to rigidly secure the bracket to the frame. A hitch beam 25 of angle iron or the like has a short angle piece 26 welded at one end thereof to square the same and that end is hinged between the middle and lower arms 21 and 22 of the bracket 19. This hinge connection is effected by a hinge pin or bolt 27 extending vertically through aligned apertures in the arms and the squared end of the beam and so held by cotter pins 28.

It will be noted in Fig. 2 that the bracket 19 is mounted at a point longitudinally on the draft frame whereby the length of the laterally unobstructed frame portion to the rear of the mounting is greater than the length of the beam 25. In other words, the bracket is mounted sufficiently forward on the draft frame to allow the beam to be swung rearwardly up to and against the frame. The draft frame is here shown as extending outside of the implement wheel. The hitch may also be used with an implement having a wheel extending laterally beyond the draft frame. In that case, however, I mount the bracket at a forward position where the hitch beam will clear the wheel when it is swung rearwardly.

A bar 29 has a terminal lug 30 at one end which is pivotally attached to the upper bracket arm 20 as at 31 and the bar extends outwardly converging toward the beam 25 to which its other end is secured as at 32. It will be obvious that this bar 29 serves as a support for the beam 25 holding the same on substantially a horizontal plane. The pivot 31 is placed on the axis of bolt 27 so that the beam and its support may be freely swung to varying angles with respect to the implement draft frame 13 without changing the vertical rigidity of the structure.

The horizontally disposed portion of the angle beam 25 has an opening near its distal end to receive the device 33 on the wagon tongue 17. Of course, any suitable means may be used to effect this connection between the hitch and wagon draft device.

At a considerable distance forward from the bracket 19 and against the outer bars 13 I provide a vertically mounted bracket 34 having an outwardly projecting lug 35. A brace bar 36 is pivotally connected on a vertical axis to the lug 35 as by a bolt 37 and extends to a point adjacent the outer end of the hitch beam 25 where it is bolted to the beam as by nut and bolt 38 to a beam mounted lug 39. The brace 36 serves to rigidly restrain the hitch beam against swinging movements about the pivot pin 27. It will be appreciated that with this construction the principal pulling strain upon the hitch beam 25 is transferred to the forward part of the implement draft frame 13 through the brace 36.

This double brace construction of the hitch frame serves to hold the beam 25 in rigid extended position with the rod 29 restraining vertical and brace 36 horizontal movement thereof.

The prinicpal advantage of my device over previous constructions is that it is adapted to be collapsed or folded to an out of the way position as shown in Fig. 2. When the wagon is not used with the implement, bolt 38 is removed and the beam 25 is folded rearwardly against the draft frame 13 where it is secured by a rope or wire 40. Similarly, the brace member 36 is folded rearward into the space in bracket 19 formed between the bracket extensions 20 and 21 where it is securely fastened by rope or wire 41. The folded position of the brace 36 can best be viewed in Fig. 3.

When hitch is collapsed and secured in the manner described it is completely out of the way. This allows the hitch frame to be permanently left on the implement in a compact secure position eliminating the necessity for separate storage or handling.

It will be obvious that the hitch as described or with slight modifications in size can be adapted for use with other agricultural implements than the combine here shown. The relatively simple construction enables the device to be rapidly mounted on the implement and quickly converted between operating and non-operating positions. There is thus provided a wagon hitch adapted to economically and efficiently carry out the aforementioned objectives.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with a tractor drawn implement having a forwardly extending draft frame, a main bracket secured to one side of the draft frame and having vertically spaced bearings, a wagon hitch beam pivotally secured to a lower bearing of the bracket for horizontal swinging movement, a truss bar pivotally secured to an upper bearing of the bracket and extending outwardly and downwardly for connection at its outer end to the hitch beam to support the latter at operative elevation, a second bracket mounted on the draft frame at a distance from the main bracket, and a diagonally disposed brace bar detachably connecting the second bracket to the hitch beam to releasably retain the hitch beam against swinging movement.

2. In combination with a tractor drawn implement having a forwardly extending draft frame, a main bracket secured to one side of the draft frame and having vertically spaced bearings, a wagon hitch beam pivotally secured to a lower bearing of the bracket for horizontal swinging movement, a truss bar pivotally secured to an upper bearing of the bracket and extending outwardly and downwardly for connection at its outer end to the hitch beam to support the latter at operative elevation, a second bracket mounted on the draft frame at a distance from the main bracket, and a diagonally disposed brace bar detachably connecting the second bracket to the hitch beam to releasably retain the hitch beam against swinging movement, said brace bar being pivotally connected to the second bracket so that it can be swung into collapsed position between the bearings of the first bracket.

FRANCIS J. KNOBLAUCH.

REFERENCES CITED

The following references are of record in the file of this patent:

UNITED STATES PATENTS

| Number | Name | Date |
|---|---|---|
| 1,941,670 | Everett | Jan. 2, 1934 |